United States Patent
Se et al.

(10) Patent No.: US 11,979,420 B2
(45) Date of Patent: May 7, 2024

(54) OPTIMIZING SELECTION AND DYNAMIC CONFIGURATION OF LOAD BALANCING TECHNIQUES TO RESIST CYBER ATTACKS

(71) Applicant: Intuit Inc., Mountain View, CA (US)

(72) Inventors: Giruba Beulah Se, Mountain View, CA (US); Glenn Carter Scott, Los Altos Hills, CA (US)

(73) Assignee: Intuit Inc., Mountain View, CA (US)

(*) Notice: Subject to any disclaimer, the term of this patent is extended or adjusted under 35 U.S.C. 154(b) by 406 days.

(21) Appl. No.: 17/491,272

(22) Filed: Sep. 30, 2021

(65) Prior Publication Data

US 2023/0101260 A1 Mar. 30, 2023

(51) Int. Cl.
| | |
|---|---|
| H04L 29/06 | (2006.01) |
| G06N 20/00 | (2019.01) |
| H04L 9/40 | (2022.01) |
| H04L 47/125 | (2022.01) |

(52) U.S. Cl.
CPC ......... *H04L 63/1425* (2013.01); *G06N 20/00* (2019.01); *H04L 47/125* (2013.01); *H04L 63/1416* (2013.01); *H04L 63/145* (2013.01)

(58) Field of Classification Search
CPC ............. H04L 63/1425; H04L 63/1416; H04L 63/145; H04L 47/125; G06N 20/00
See application file for complete search history.

(56) References Cited

U.S. PATENT DOCUMENTS

| | | | |
|---|---|---|---|
| 8,937,942 B1* | 1/2015 | Li | H04L 69/22 709/227 |
| 10,055,262 B1* | 8/2018 | Thomas | G06F 9/5083 |
| 10,505,849 B1* | 12/2019 | Iny | H04L 47/283 |
| 2008/0225710 A1* | 9/2008 | Raja | G06F 9/505 370/230.1 |
| 2014/0101306 A1* | 4/2014 | Murgia | H04L 47/125 709/224 |
| 2014/0359131 A1* | 12/2014 | Seed | H04L 67/1031 709/226 |
| 2015/0200857 A1* | 7/2015 | Tang | H04L 47/125 370/236 |
| 2016/0148076 A1* | 5/2016 | Kozitsky | G06V 20/62 382/159 |
| 2018/0115566 A1* | 4/2018 | Azvine | H04L 63/0428 |
| 2019/0268405 A1* | 8/2019 | Nasir | H04L 67/101 |
| 2019/0394667 A1* | 12/2019 | Shariati | H04W 28/0205 |
| 2020/0007432 A1* | 1/2020 | McDonald | H04L 45/124 |

* cited by examiner

*Primary Examiner* — Vance M Little
(74) *Attorney, Agent, or Firm* — Lathrop GPM LLP

(57) ABSTRACT

A method including transforming metrics, related to a computer network environment, into a digital image including pixels that represent the metrics. The computer network environment initially is load balanced by a first load balancing scheme selected from among load balancing schemes. The method also includes generating a classification of the digital image. The method also includes selecting, based on the classification of the digital image, a selected load balancing scheme from among the load balancing schemes. The method also includes changing the first load balancing scheme to the selected load balancing scheme such that the selected load balancing scheme is applied to the computer network environment.

20 Claims, 5 Drawing Sheets

OPTIMIZING SELECTION AND DYNAMIC CONFIGURATION OF LOAD BALANCING TECHNIQUES TO RESIST CYBER ATTACKS

BACKGROUND

Load balancing is the process of distributing a set of tasks over a set of resources, with the aim of improving the efficiency of the resources at performing the set of tasks. For example, load balancing techniques in computer networks can improve the efficiency of performing computing tasks by avoiding unevenly loading computing tasks to some computer resources in the network while other computer resources in the network are left idle. Different network load balancing techniques exist.

A malicious user may observe the behavior of a computer network in order to guess or discern the load balancing technique applied to the computer network. Once the malicious user guesses or discerns the load balancing technique being applied, the malicious user may initiate a cyber-attack that is particularly effective against the current load balancing technique applied to the computer network.

SUMMARY

The one or more embodiments provide for a method. The method includes transforming metrics, related to a computer network environment, into a digital image including pixels that represent the metrics. The computer network environment initially is load balanced by a first load balancing scheme selected from among load balancing schemes. The method also includes generating a classification of the digital image. The method also includes selecting, based on the classification of the digital image, a selected load balancing scheme from among the load balancing schemes. The method also includes changing the first load balancing scheme to the selected load balancing scheme such that the selected load balancing scheme is applied to the computer network environment.

The one or more embodiments also provide for a system. The system includes a processor and a computer network environment in communication with the processor. Initially, a first load balancing scheme is applied to the computer network environment. The system also includes a data repository in communication with the processor. The data repository stores metrics relating to the computer network environment. The data repository also stores a digital image including pixels that represent the metrics. The data repository also stores a classification of the digital image. The data repository also stores load balancing schemes applicable to balancing a network load in the computer network environment. The first load balancing scheme is selected from the load balancing schemes. The data repository also stores a selected load balancing scheme selected from the load balancing schemes. The system also includes an image generation engine configured to transform the metrics into the digital image. The system also includes an image recognition machine learning model configured to take, as input, the pixels and produce, as output, the classification. The system also includes a selection controller configured to select the selected load balancing technique based on the classification. The controller is also configured to change the first load balancing scheme to the selected load balancing scheme such that the selected load balancing scheme is applied to the computer network environment.

The one or more embodiments also provide for another method. The method includes transforming metrics, related to a computer network environment, into a digital image including pixels that represent the metrics. The computer network environment initially is load balanced by a first load balancing scheme selected from among load balancing schemes. The method also includes generating a masked digital image by applying a mask to the digital image by further modifying the digital image to bias a classification of the digital image either towards a selected classification of the digital image or away from the selected classification. The method also includes generating the classification of the digital image by executing an image recognition machine learning model that takes, as input, the pixels of the masked digital image and that produces, as output, the classification of the digital image. The classification is one of the selected classification or a second classification of the digital image. The method also includes selecting, based on the classification of the digital image, a selected load balancing scheme from among the load balancing schemes. The method also includes changing the first load balancing scheme to the selected load balancing scheme such that the selected load balancing scheme is applied to the computer network environment.

Other aspects of the one or more embodiments will be apparent from the following description and the appended claims.

DETAILED DESCRIPTION

Figure 1:
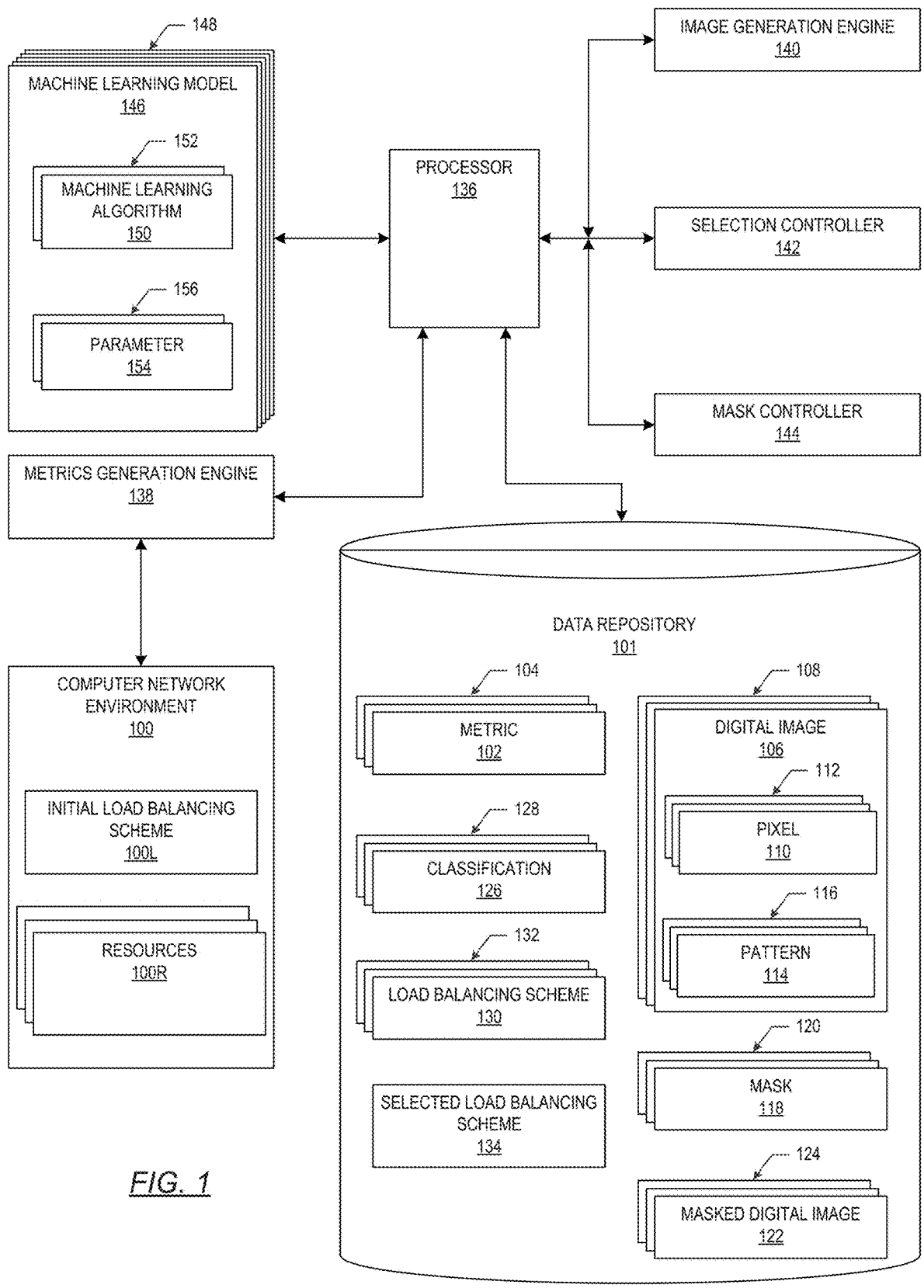
FIG. 1 shows a computing system, in accordance with one or more embodiments.

Specific embodiments will now be described in detail with reference to the accompanying figures. Like elements in the various figures are denoted by like reference numerals for consistency.

In general, the one or more embodiments related to techniques for defending a computer network environment against a cyber-attack by a malicious user. In particular, the one or more embodiments are directed towards automatically selecting or changing a load balancing technique applied to a network. If detection occurs of a cyber-attack designed to attack a particular type of load balancing technique, the one or more embodiments provide for an automatic change to the load balancing technique applied to the computer network environment. In this manner, the cyber-attack against the computer network environment may be thwarted or blunted.

Briefly, the one or more embodiments convert network metrics into an image. The one or more embodiments then use an image recognition machine learning model (or other heuristics) to classify the image. The one or more embodiments then use the classification of the image to determine automatically which of several load balancing schemes to apply to the current state of the network.

Attention is turned to a summary of the procedures of the one or more embodiments. The process of detecting cyber-attacks begins with monitoring the computer network. Monitoring the network generates metrics. The metrics describe the behavior of the computer network environment.

The metrics are converted into a digital image composed of pixels. A pixel represents a "dot" in the image. The location of a pixel in the digital image may indicate a type of metric (e.g. network latency), and the intensity or color of the pixel may indicate a numerical value of the metric (e.g., a darker pixel may indicate a relatively high latency relative to an expected normal operating value of latency in the network). Many different pixels may be used to represent many different types of metrics. Together, the many pixels form the digital image. Because the digital image is composed of pixels that represent the metrics, the digital image represents a current state of the computer network.

The digital image is fed as input to one or more image recognition algorithms, such as but not limited to a machine learning model. The one or more image recognition algorithms generate a classification of the image. The classification is fed as input to heuristics, which may be rules and/or another machine learning model. The heuristics select an appropriate load balancing technique, from among multiple possible load balancing techniques, based on the classification of the image.

The above-described process may be repeated continuously. Thus, the computer network environment may be evaluated continually, and the load balancing technique updated accordingly. Hence, a malicious user will have difficulty initiating a cyber-attack that is specifically tailored to attack a computer network environment being governed by a particular load balancing technique.

For example, as the malicious user attempts new cyber-attacks on the load balancing technique being used at any time, the system responds by automatically updating the load balancing scheme, using the above procedure, according to the effect that the attack has on the network. As a result, the procedure described above aids in preventing the computer network from being overwhelmed by the cyber-attack. Thus, the one or more embodiments may be used to mitigate or stop cyber-attacks.

Attention is now turned to the figures. FIG. 1 shows a computing system, in accordance with one or more embodiments. The computing system includes a computer network environment (100). The computer network environment (100) is two or more computers and/or software applications networked together using wired or wireless communications. The network communication may be continuous or intermittent.

The computer network environment (100) includes resources (100R). The resources are the hardware and/or software of the computer network environment (100) that work together to accomplish a computing task. The hardware may include processors, hard drives, routers, bus systems, network cables, etc. The software may include applications, business systems, machine learning models, etc. The task may be, for example, an enterprise configured to host a suite of Web applications or may be an electronic business payment system. The computer network environment (100) may be configured to perform many different tasks.

The computer network environment (100) may have an initial load balancing scheme (100L) applied to the computer network environment (100). The initial load balancing scheme (100L) balances computer execution tasks among the resources (100R) available to the computer network environment (100). The initial load balancing scheme (100L) may have been selected from among multiple load balancing schemes (132), which are described further below.

The computing system also includes a data repository (101). In one or more embodiments, the data repository (101) is a storage unit and/or device (e.g., a file system, database, collection of tables, or any other storage mechanism) for storing data. Further, the data repository (101) may include multiple different storage units and/or devices. The multiple different storage units and/or devices may or may not be of the same type and may or may not be located at the same physical site.

The data repository (101) stores a metric (102) among multiple metrics (104). The metric (102) is a measurement of some aspect of the computer network environment (100). Examples of metrics include response time of a network, the current load of a network, the data throughput of the network, link utilization, a number of hops, a speed of a network path, packet loss, latency, path reliability, path bandwidth, a maximum transmission unit, an administrator configured value, and possibly other metrics.

The data repository (101) also stores a digital image (106) among possibly multiple digital images (108). The digital image (106) is a picture. The digital image (106) may be gray scale, color, pixelated, and may be of various image file types.

The digital image (106) is composed of at least one pixel (110), but usually multiple pixels (112). A pixel is a single dot or unit of color. Multiple pixels (112) together can form any shape or image.

The multiple pixels (112) are arranged in a pattern (114), or possibly are arranged into multiple pattern (116). The pattern (114) may form an overall shape for the digital image (106). The pattern (114), instead of or possibly in addition to forming the overall shape, also may include one or more shapes within the digital image (106). For example, the digital image (106) may assume, overall, the shapes shown in FIG. 4A-4B. In another example, the digital image (106) may have one or more shapes contained within the digital image (106).

The shape or shapes may be a human-recognizable image in some cases, and/or may be machine readable. For example, the digital image (106) may take the form of an emoji, a pedestrian, a bicyclist, an automobile, a train, or an airplane. The type of shape shown may encode speed or load. Thus, the type of shape may serve not only purposes of automated load balancing, as described with respect to FIG. 2, but to also enable rapid human assessment.

The digital image (106) encodes information describing the metric (102) or the multiple metrics (104). The process of encoding the information describing the metric (102) or the multiple metrics (104) into the digital image (106) or the multiple digital images (108) is described with respect to FIG. 2.

The digital image (106) may encode the metric information using one or more techniques. For example, a position of a pixel (110) in the digital image (106) can encode information. A color or an intensity of a pixel (110) in the digital image (106) can encode information. For example, for a grayscale image The position of the pixel indicates that the pixel has encoded a response time. A dark pixel may reflect a first pre-determined range of response time, and a light pixel may reflect a second, lesser pre-determine range of response time.

Other properties of the digital image (106) may encode information about the metric (102) or the multiple metrics (104). For example, the pattern (114) may encode information about one or more of the multiple metrics (104). Thus, shapes formed within the digital image (106) may indicate network loads, distribution of tasks to different zones or processors within a network, or many other types of network information.

In another example, a size of the pixel (110) may indicate information about the metric (102) or the multiple metrics (104). Thus, for example, a smaller pixel may indicate a faster response time, but a larger pixel may indicate a slower response time. Other techniques for encoding the metric (102) or the multiple metrics (104) into the digital image (106) are also contemplated.

The data repository (101) also stores a mask (118) among possibly multiple masks (120). The mask (118) is a filter or set of rules that modify the digital image (106) and/or the multiple digital images (108). For example, the mask (118) may be a filter that brightens one or more of the multiple pixels (112), changes a color or intensity of the multiple pixels (112), changes one or more of the multiple pattern (116), or in some other way changes the digital image (106). In other words, the digital image (106) may be blurred, cropped, or its dynamic range modified.

The mask (118) is configured to bias how the digital image (106) and/or the multiple digital images (108) will be interpreted by the selection controller (142) (described below). For example, the mask (118) may be applied to bias the digital image (106) so that it is more likely that a specific one of the multiple load balancing schemes (132) (described below) are selected by the selection controller (142) (de-scribed below). In the case of the machine learning algorithm (150) (described below), application of the mask (118) may be used to change the output of the machine learning algorithm (150) without changing the machine learning algorithm (150) itself.

The data repository (101) also stores a masked digital image (122), among possibly multiple masked digital images (124). The masked digital image (122) is the digital image (106) after the mask (118) has been applied. Thus, the masked digital image (122) is a transformation of the digital image (106).

The data repository (101) also stores a classification (126) among possibly multiple classifications (128). The classification (126) is a predicted meaning of the digital image (106) with respect to the state of the computer network environment (100). For example, the classification (126) may indicate that the computer network environment (100) is the subject of a cyber-attack by a malicious user. The classification (126) may indicate that the state of the network is under a heavy or a light load. The classification (126) may indicate that a certain type of the load balancing scheme (130) (described below) should be applied to the computer network environment (100). Other types of classifications are contemplated. In any case, the classification (126) represents some automated conclusion or prediction regarding some aspect of the computer network environment (100).

The classification is an output of heuristics (e.g., software) or the machine learning algorithm (150) (described above). There may be multiple classifications (128) for multiple machine learning algorithms (152).

The classification (126) is produced by the selection controller (142) and/or the machine learning algorithm (150). For example, an input to the machine learning algorithm (150) may be the digital image (106), and an output of the machine learning algorithm (150) may be the classification (126). Similarly, heuristics in the selection controller (142) may take, as input, the digital image (106) and produce, as output, the classification (126).

The data repository (101) also stores a load balancing scheme (130) among multiple load balancing schemes (132). The one or more embodiments contemplate that many load balancing schemes exist and are stored in the data repository (101). The initial load balancing scheme (100L) that is initially applied to the computer network environment (100) may be, for example, the load balancing scheme (130).

The load balancing scheme (130) is a rule or a set of rules, or possibly a computer program or machine learning algorithm, that is applied to the computer network environment (100) in order to change how the computer network environment (100) distributes computing tasks to the resources (100R) of the computer network environment (100).

Different types of load balancing schemes exist. For example, a static load balancing scheme distributes the computing tasks to the resources (100R) according to some pre-determined arrangement independent of total load of the computer network environment (100), or based solely on proximity of the task request to the resource in question. In another example, a dynamic load balancing scheme takes into account the load of the computer network environment (100) or some other aspect of the computer network environment (100) when determining how to assign the resources (100R) to the computing tasks. The assignment of computing tasks to the resources (100R) changes over time accordingly.

In still another example, a work stealing load balancing scheme is used. In work stealing, a certain number of tasks are assigned to each processor in a random or predefined manner. Then inactive processors are allowed to "steal" work from active or overloaded processors. Several implementations of work stealing exist, defined by a task division model and by the rules determining the exchange between processors.

Many other types of the multiple load balancing schemes (132) are contemplated. For example, the multiple load balancing schemes (132) may include round-robin scheduling, randomized static distribution, master-worker schemes, client-side random load balancing, path bridging, failover schemes, and others.

Different load balancing schemes have different vulnerabilities to cyber-attacks. Thus, for example, a malicious user may observe the behavior of the computer network environment (100), discern or guess at the initial load balancing scheme (100L), and then attack the specific vulnerability of the initial load balancing scheme (100L). As a result, the malicious user may be able to more easily succeed at a denial-of-service attack.

As an example, a malicious user may attempt a reservation attack against a static load balancing scheme. Reservation attacks are a form of denial-of-service in which an attacker rapidly and repeatedly establishes a reservation for a resource, without follow through in using the resource. For example, in modern computer communication, a "SYN flood attack" is a form of denial-of-service attack in which an attacker rapidly and repeatedly initiates a Transport Control Protocol (TCP) connection to a server without finalizing the connection handshake. The attack causes the computer network environment (100) to spend resources waiting for yet-to-be-completed handshake. Thus, the attack consumes enough of the resources (100R) to make the system ultimately unresponsive to legitimate traffic. A static load balancing scheme may be vulnerable to a reservation attack because certain resources in proximity to the input pathway of the reserve attack may be quickly overwhelmed.

Other load balancing schemes may have other vulnerabilities. Thus, thus, a technical problem exists within the computer network environment (100). The technical problem is thwarting cyber-attacks against a malicious user that is actively attempting to identify and then take advantage of a specific vulnerability of the initial load balancing scheme (100L).

The one or more embodiments described herein address the technical problem with a technical solution. Namely, as described further with respect to FIG. 2, the one or more embodiments use image classification to identify the state of the computer network environment (100) and then rapidly change or update initial load balancing scheme (100L) accordingly with a different one of the multiple load balancing schemes (132) that is most suited to handling the current state of the computer network environment (100).

The load balancing scheme that is selected based on the image classification is the selected load balancing scheme (134). The selected load balancing scheme (134) is one of the multiple load balancing schemes (132).

The system shown in FIG. 1 includes additional components. For example, the system also includes a processor (136). The processor (136) is one or more hardware or virtual processors that execute the metrics generation engine (138), the image generation engine (140), selection controller (142), mask controller (144), and the machine learning model (146), described below. The processor (136) may be part of, or independent of, the computer network environment (100). The processor (136) may be the computer processor(s) (502) of FIG. 5A.

The system shown in FIG. 1 also includes a metrics generation engine (138). The metrics generation engine (138) is hardware and/or software that is programmed to generate the metric (102) and the multiple metrics (104) from the computer network environment (100). The metrics generation engine (138) may simply observe and record the metric (102). However, the metrics generation engine (138) may also transform or classify certain metrics, and then store the transformed results as one or more of the multiple metrics (104). For example, the metrics generation engine (138) may transform one or more of the multiple metrics (104) into a vector suitable for input to the multiple machine learning models (148), described below.

The system shown in FIG. 1 also includes an image generation engine (140). The image generation engine (140) is hardware and/or software that is programmed to transform the multiple metrics (104) into the digital image (106). Transformation of the multiple metrics (104) into one or more of the multiple digital images (108) is described with respect to FIG. 2.

The system shown in FIG. 1 also includes a selection controller (142). The selection controller (142) is hardware and/or software that is programmed to select the selected load balancing scheme (134) from among the multiple load balancing schemes (132) based on the classification (126) of the multiple digital images (108). Selection of the selected load balancing scheme (134) is described with respect to FIG. 2.

The selection controller (142) may also be programmed to change the initial load balancing scheme (100L) to the selected load balancing scheme (134). In other words, the selection controller (142) may be programmed to control which of the multiple load balancing schemes (132) is applied to the computer network environment (100).

The system shown in FIG. 1 also includes a mask controller (144). The mask controller (144) is hardware and/or software that is programmed to generate the mask (118). The mask controller (144) is also programmed to apply the mask (118) to the digital image (106). Description of building and use of the mask (118) is described with respect to FIG. 2.

The system shown in FIG. 1 also includes a machine learning model (146) among possibly multiple machine learning models (148). A machine learning model (146) includes a machine learning algorithm (150) or possibly machine learning algorithm (150). The machine learning model (146) also includes a parameter (154) or possibly multiple parameters (156). The parameter (154) changes how the multiple machine learning algorithms (152) operates on the input to the machine learning model. Thus, changing the parameter (154) causes the machine learning algorithm (150) to produce a different output.

The machine learning algorithm (150) may take the form of a deep convolutional generative adversarial network (DCGAN). The DCGAN is a group of machine learning algorithms (i.e., may be the multiple machine learning algorithms (152)). For example, the GAN (generative adversarial network) includes a generator (one machine learning algorithm) and a discriminator (another machine learning algorithm). The generator spawns fake images that look like training images. The discriminator analyzes the fake images and outputs whether the image is a real image or a fake image from the generator. The generator is thus attempting to outsmart the discriminator, while the discriminator attempts to correctly classify the real and increasingly better fake images. Equilibrium is established when the generator produces images so like the training images that the discriminator has, at best, a 50% confidence that the generator output is real or fake.

The DCGAN is a GAN, but uses convolutional and convolutional-transpose layers in the discriminator and the generator, respectively. The discriminator is made up of strided convolution layers, batch norm layers, and LeakyReLU activations. The input is a 3×64×64 input image and the output is a scalar probability that the input is from the real data distribution. The generator is composed of convolutional-transpose layers, batch norm layers, and ReLU activations. The input is a latent vector that is drawn from a standard normal distribution and the output is a 3×64×64 red-green-blue image.

Figure 2:
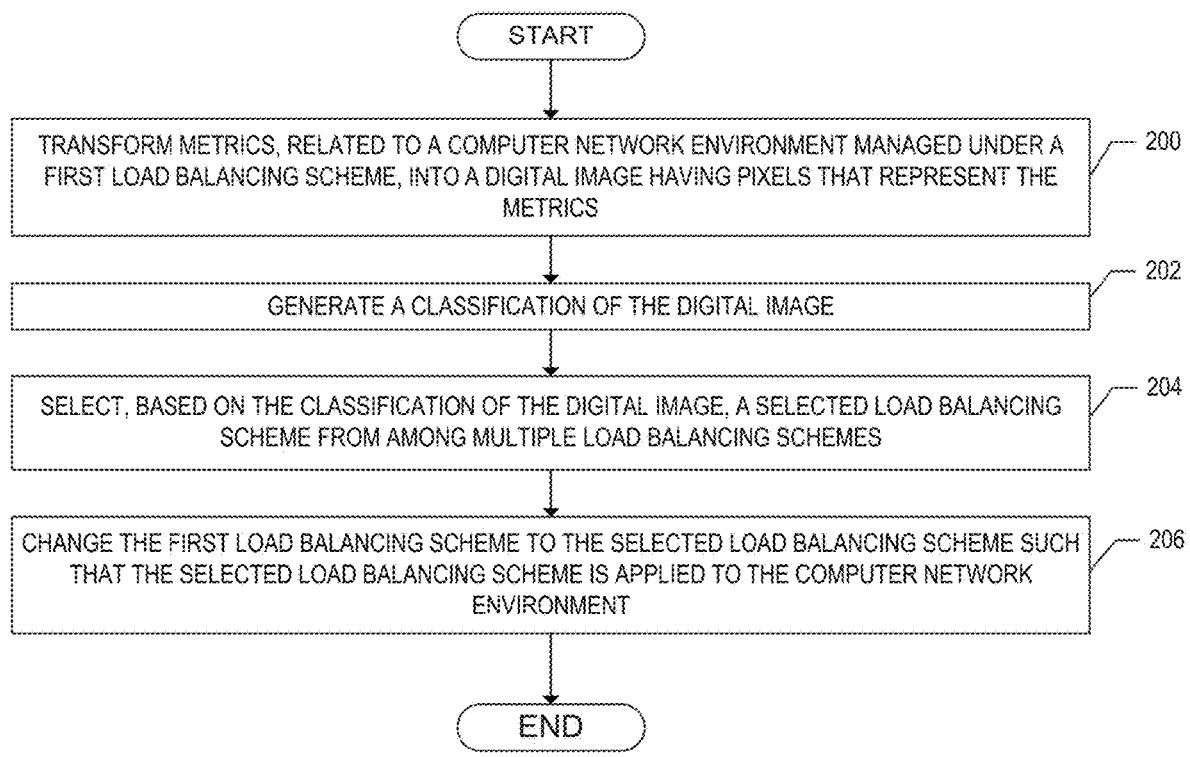
FIG. 2 shows a flowchart of a method for automatically changing a load balancing scheme applied to a computer network, in accordance with one or more embodiments.

Use of one or more of the multiple machine learning models (148) is described with respect to FIG. 2. Briefly, however, the generator generates permutations of known misconfigurations, and the discriminator identifies whether the permutations are malicious or not malicious. The same or different machine learning algorithm can then classify a type of the malicious cyber-attack. The selection controller (142) selects the selected load balancing scheme (134) for the computer network environment (100) accordingly.

While FIG. 1 shows a configuration of components, other configurations may be used without departing from the scope of the one or more embodiments. For example, various components may be combined to create a single component. As another example, the functionality performed by a single component may be performed by two or more components.

FIG. 2 shows a flowchart of a method for automatically changing a load balancing scheme applied to a computer network, in accordance with one or more embodiments. The method of FIG. 2 may be implemented using the system shown in FIG. 1.

Step 200 includes transforming metrics, related to a computer network environment, into a digital image having pixels that represent the metrics. The metrics may be transformed, or encoded, into the digital image by a variety of different techniques. For example, the metrics may be encoded into a grayscale image. A location of a pixel in the image represents a type of the metric (e.g., network data throughput, response time, latency, etc.). An intensity of the pixel represents a value of the metric (e.g., a high latency may be represented by a darker pixel and a low latency may be represented by a lighter pixel). A size of a pixel, or a grouping of multiple pixels, may represent other aspects of the metric (e.g., a size of a pixel or a grouping of pixels may represent a zone in which the pixel was taken, a variability of a rate of change of the metric, the degree of the metric (instead of or in addition to the intensity), or other aspects of the metric). A shape of a pixel, or a shape of multiple pixels, may represent still other information (e.g., the type of users of the network, a state of a network resource responsible for causing a process being measured, or other aspects of the metric).

As a specific example, the pixels could be arranged into a human-readable shape depending on pre-determined rules to show a specific, or an overall, state of the computer network environment. For example, a sequence of images such as a pedestrian, a bicyclist, an automobile, a train, and an airplane could be used to encode speed or load in order to enable more rapid human assessment of the state of the computer network environment. In another example, an emoji may be used to encode a likelihood of the presence of a malicious user, a response time of the computer network environment, or other types of states of the computer network environment. Examples emojis include a happy face, smiley face, normal face, surprised face, ecstatic face (e.g. smiley with starry eyes), or some other emoji.

A shape may be further varied, or presented in combinations, to show variations. Thus, for example, both the emoji and the aircraft may be shown in tandem or combined in order to display other information rapidly to a human. Still other variations are possible.

From the above, an example of transforming may include selecting at least one selected pixel from the pixels to represent a selected metric from the metrics. The method of transforming then includes selecting at least one of a color and an intensity of the at least one selected pixel to represent a measured value of the selected metric.

Another example of transforming may include selecting a sub-set of pixels from pixels to form a pattern. The pattern represents a selected metric from the metrics. The pattern may be formed into a human recognizable pattern. In addition, another example of transforming includes selecting at least one of a size of the pattern, a type of the pattern, an intensity of the pattern, and a color of the pattern to represent a measured value of the selected metric. Other variations are possible.

Regardless of how the metrics are transformed or encoded into the digital image, the computer network environment initially is load balanced by a first load balancing scheme. The first load is selected from among multiple load balancing schemes available to be applied to the computer network environment.

Step 202 includes generating a classification of the digital image. The classification may be performed either by heuristics (i.e. hardware or software implementation of rules and policies to recognize aspects of the encoded digital image) or by machine learning (i.e., a machine learning model composed of one or more machine learning algorithms). For example, in the case of heuristics, the states of the pixels could be compared to threshold values for intensity, location, size, shape, etc. in order to determine the classification of the image.

In addition, or in the alternative, machine learning may be used to classify the digital image. Thus, for example, classifying may include executing an image recognition machine learning model that takes, as input, the pixels of the digital image and that produces, as output, the classification of the digital image. As a more specific example, a deep convolutional generative adversarial network (DCGAN) may be used as the machine learning algorithm. The generator of the DCGAN generates permutations of known misconfigurations of digital image. The discriminator of the DCGAN determines a probability that the permutation is correct. The result of the adversarial network is a final image that is compared to known permutations of the digital image, that have known states of the computer network environment. The result is that the digital image is classified, and hence the state of the computer network environment is likewise classified.

The method of FIG. 2 may be varied. For example, the classification may be biased by modifying the digital image by applying a mask to the digital image. The modification of the digital image is performed prior to step 202, and thus prior to executing the machine learning model. The mask is configured to improve a probability that the image recognition machine learning model outputs the classification to favor selection of a particular load balancing scheme, such as a load balancing scheme preferred by a human user. Applying the mask to the digital image performs at least one of highlighting or deemphasizing at least one portion of the digital image. Because the digital image is changed, the classification of the digital image may be changed, resulting in possibly a different selection of a load balancing scheme at step 204.

Other variations to the method of FIG. 2 are possible. For example, the method of FIG. 2 may also include, prior to step 202, training the image recognition machine learning model using past images generated from past metrics of the computer network environment.

Training the machine learning model involves providing a portion of known data (i.e., the past images) having known correct classifications. If the predictions of the machine learning model do not match the correct classifications, then a loss function is generated. The loss function is used to adjust one or more parameters of the machine learning model. The updated machine learning model is re-executed on the portion of the known data and an updated set of classifications are generated. A new loss function is generated, and the one or more parameters updated accordingly. The process repeats until convergence. Convergence occurs when the predicted classifications match the correct classifications to a pre-determined degree (e.g., 95%), or after a pre-determined number of iterations. After convergence, the trained machine learning model may be tested on the portion of the original known data that had not been used during training. Once the trained machine learning model is accepted by a human user, or by an automated process, the trained machine learning model may be used to make predictions with respect to unknown or new data.

Step 204 includes selecting, based on the classification of the digital image, a selected load balancing scheme from among the load balancing schemes. A number of different techniques may be used to select the selected load balancing scheme based on the classification of the digital image. In general, the classification of the image indicates one or more states of the computer network environment. Heuristics (i.e. software, hardware, or a combination thereof) can then be used to select automatically the load balancing scheme based on the state of the computer network environment.

In one example, a static load balancing scheme may be selected when the digital image is classified as a low traffic image. In another example, a dynamic load balancing scheme may be selected when the digital image is classified as a medium traffic image. In still another example, a work stealing load balancing scheme may be selected when the digital image is classified as a heavy traffic image. In yet another example, periodic switching may be performed between the dynamic load balancing scheme and the work stealing load balancing scheme when the digital image is classified as representing a presence of a malicious user. Other examples are possible.

In addition, combinations of load balancing strategies may be selected. Different zones and/or data centers of a computer network environment may be categorized differently and have different load balancing schemes. For example, if a zone or data center has very minimal traffic, use or switch to a static load balancing technique may be used in that zone or data center. However, if a zone or data center has medium traffic, then a primary-secondary dynamic load balancing scheme may be used to balance loads among different zones or data centers. High traffic zones or data centers may employ a work stealing load balancing technique at a first time, whereas a dynamic load balancing technique may be applied to the zone or data center at a different time in order to foil a potential denial of service attack. Other combinations are possible.

Step 206 includes changing the first load balancing scheme to the selected load balancing scheme such that the selected load balancing scheme is applied to the computer network environment. Changing may be performed by a network administrator or by an automated process. Changing the load balancing scheme may be accomplished via selecting a new application or a new set of standards to be applied to balancing loads on the computer network environment.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Figure 3:
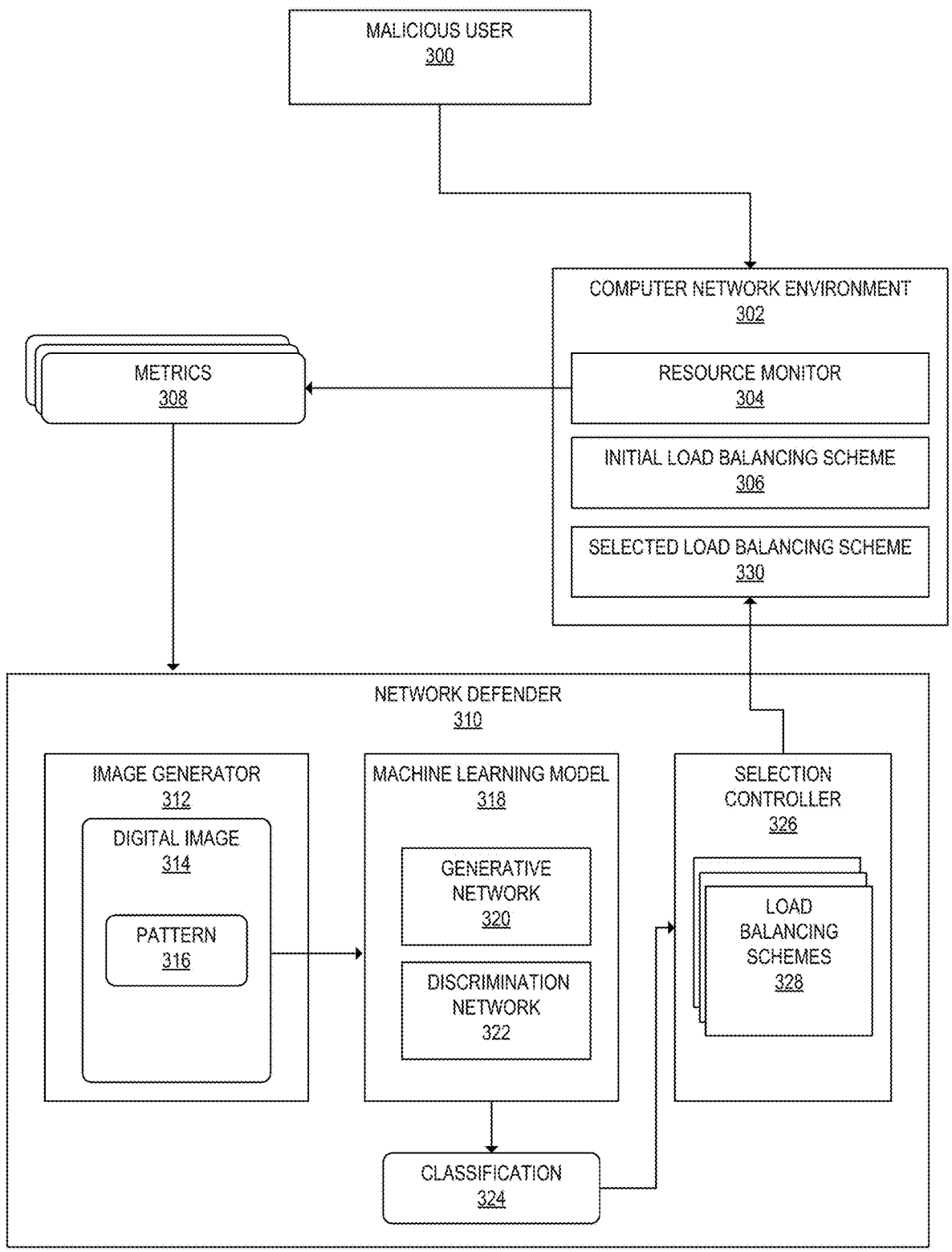
FIG. 3 shows an example of a system for defending a computer network environment against cyber-attacks performed by a malicious user, in accordance with one or more embodiments.

FIG. 3 shows an example of a system for defending a computer network environment against cyber-attacks performed by a malicious user, in accordance with one or more embodiments. The system shown in FIG. 3 is a variation of the system shown in FIG. 1. The load balancing selection technique is described with respect to FIG. 2.

Initially, a malicious user (300) is observing the computer network environment (302) in order to determine a vulnerability in the computer network environment (302). The malicious user (300) observes that the computer network environment is using an initial load balancing scheme (306). The malicious user (300) then initiates a cyber-attack designed to take advantage of a vulnerability in the initial load balancing scheme (306).

Concurrently, the computer network environment uses a resource monitor (304) to gather metrics (308) on the computer network environment (302). The metrics (308) are provided to a Network Defender (310). The term "Network Defender" refers to the one or more applications and/or hardware used to implement the load balancing selection technique.

The Network Defender (310) includes an image generator (312), which receives the metrics (308). The image generator (312) converts the metrics (308) into a digital image (314). The digital image (314) has a pattern either inside of the digital image (314), or the digital image (314) itself is formed into a pattern, or a combination thereof.

The digital image (314) is provided to a machine learning model (318). The machine learning model (318) is configured to classify the digital image (314). Classification of the digital image (314) reflects a state of the computer network environment (302), as measured by the metrics (308). The machine learning model (318) is a DCGAN is a GAN. A GAN includes an adversarial machine learning network in which the generative network (320) and the discrimination network (322) act in opposition to each other. A DCGAN is a direct extension of the GAN, except that the DCGAN uses convolutional and convolutional-transpose layers in the discrimination network (322) and the generative network (320), respectively.

The output of the machine learning model (318) is a classification (324). The classification (324) classifies the image according to a state of the computer network environment (302). The classification (324) may also be used to determine a type of attack being used by the malicious user (300).

The classification (324) is provided to a selection controller (326). The selection controller (326) selects a selected load balancing scheme (330) from among multiple load balancing schemes (328). The selected load balancing scheme (330) is different than the initial load balancing scheme (306). As a result, the computer network environment (302) is less vulnerable to the specific attack being used by the malicious user (300).

The process may continue indefinitely. As the malicious user (300) continues to vary the type of cyber-attack being used, metrics (308) are concurrently gathered and provided to the Network Defender (310) to generate continuing updates to the selected load balancing scheme (330).

Figure 4A:
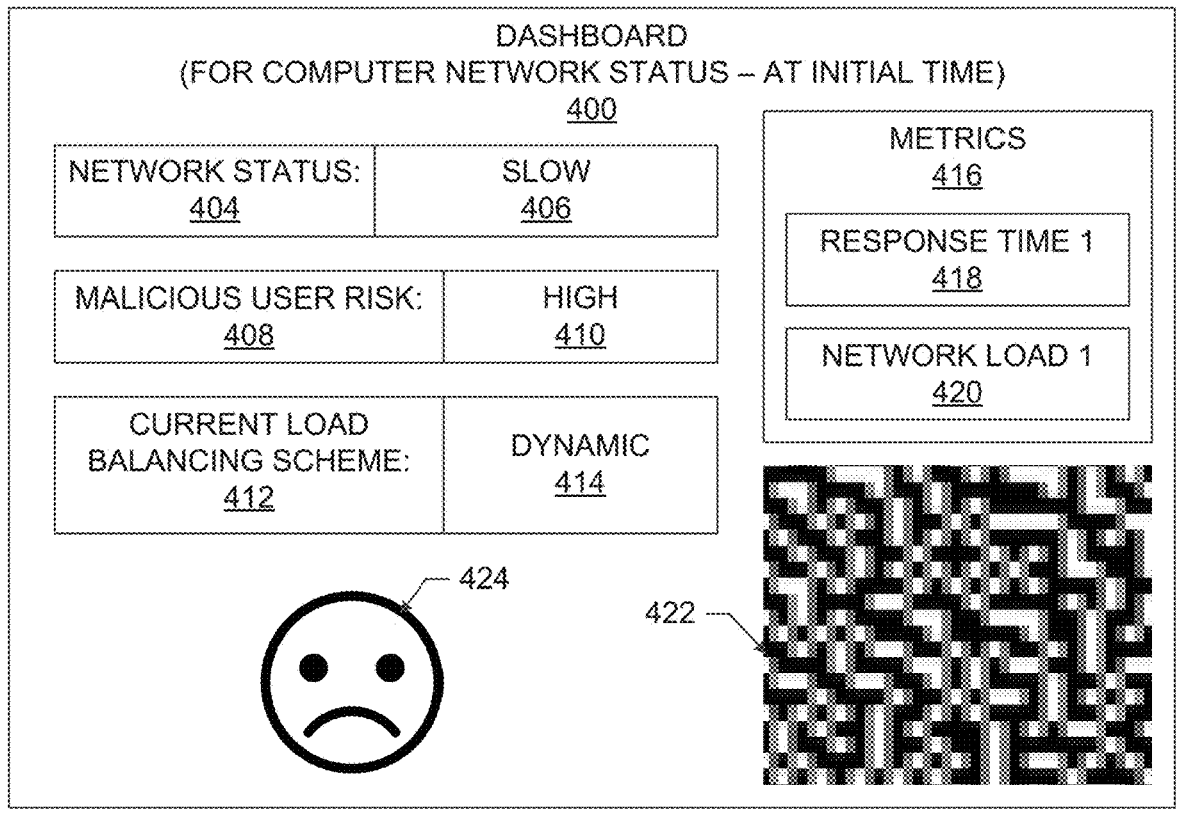
FIG. 4A and FIG. 4B show sample graphical user interfaces of a dashboard showing statuses of a computer network, in accordance with one or more embodiments.
Figure 4B:
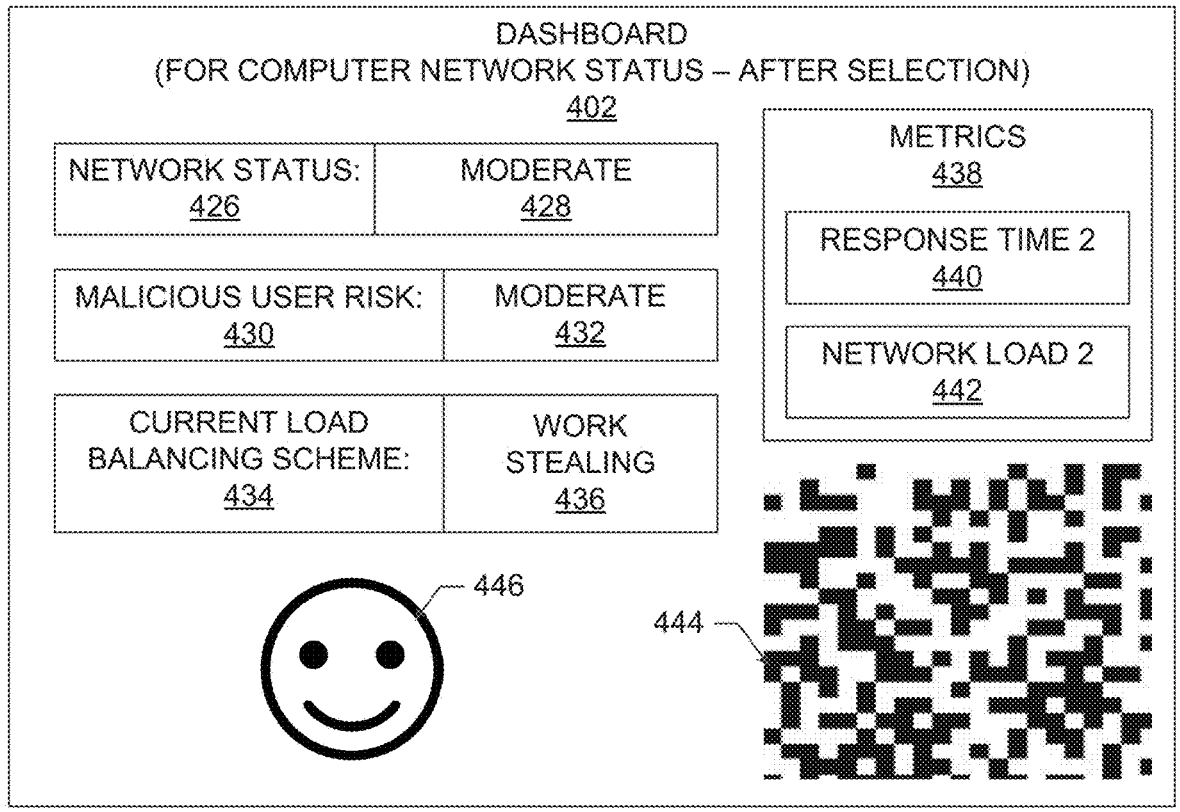

FIG. 4A and FIG. 4B show sample graphical user interfaces of a dashboard showing statuses of a computer network, in accordance with one or more embodiments. The dashboard (400) of FIG. 4A and the dashboard (402) of FIG. 4B may be examples of a graphical user interface (GUI) that is presented to a computer technician or other human user responsible for monitoring the computer network environment (302) shown in FIG. 3 or the computer network environment (100) shown in FIG. 1. The selected load balancing techniques described with respect to FIG. 4A and FIG. 4B are selected according to the method described with respect to FIG. 2. The dashboards of FIG. 4A and FIG. 4B may be generated by the selection controller (142) of FIG. 1.

Attention is first turned to FIG. 4A. The dashboard (400) shows a status of a computer network environment at an initial time. A network status (404) is shown in a network status value box (406). The network status is "slow." A malicious user risk (408) is shown in a risk value box (410). The malicious user risk is "high." A current load balancing scheme (412) is shown in a scheme value box (414). The current load balancing scheme is "dynamic." Metrics (416) are also shown. A response time 1 (418) is shown for the response time of the computer network environment, and a network load 1 (420) is shown for the current load on the computer network environment.

The metrics (416) have been converted into a digital image (422). The digital image (422) is composed of pixels in which the proportion of darker pixels indicate higher network loads and/or lower response times, possibly in different zones or data centers of the computer network environment. The digital image (422) is the digital image (314) used by the Network Defender (310) in FIG. 3. The digital image (422) is displayed for subject matter experts familiar with how to interpret the information conveyed by the digital image (422)

However, the digital image (422) is also converted into a frown emoji (424). The frown emoji (424) indicates quickly to a human user that the overall status of the computer network environment is not satisfactory at the initial time. The frown emoji (424) is an example of a human-recognizable pattern.

However, the one or more embodiments do not necessarily have to favor use of either the digital image (422) or the frown emoji (424) in order to function. Instead, any representational image may be used, so long as the location and color/intensity of the pixels of the image represent the network metrics.

The example images shown in FIG. 4A and FIG. 4B may be varied. For example, in an embodiment, only one such image is used. In an embodiment, neither image is displayed to a user, though the digital image is still stored in the form of a digital file which a machine learning model may use to classify the digital image (even if not displayed to a user). In still another embodiment, more than two different images may be shown. For example, a series of images may show the changing status of the network over time. In yet another embodiment, different images other than emojis or snow patterns may be shown.

Attention is now turned to FIG. 4B. The dashboard (402) is similar to the dashboard (400) shown in FIG. 4A. However, the dashboard (402) shows a state of the computer network environment at some time after the selection of a new load balancing scheme according to the method of FIG. 2.

The network status (426) is now "moderate" (428). The malicious user risk (430) is now "moderate" (432). The current load balancing scheme (434) is "work stealing" (436). The metrics (438) now show different response times: response time 2 (440) and network load 2 (442). Additionally, the digital image (444) is shown. As can be seen, fewer pixels in the digital image (444) are dark, relative to the digital image (442) in FIG. 4A. Additionally, a smile emoji (446) shows at a glance that the computer network environment is operating within expected operating parameters. The smile emoji (446) is an example of a human-recognizable pattern.

Figure 5A:
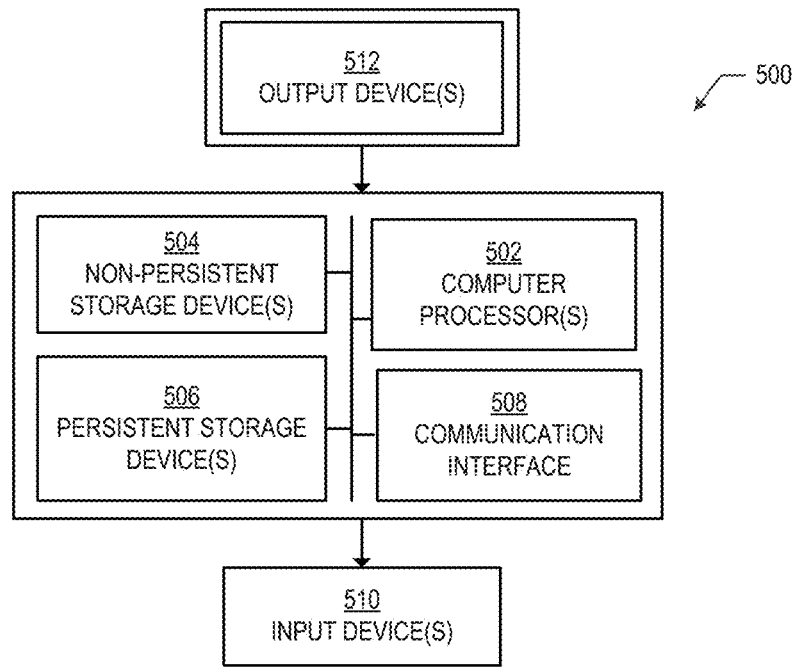
FIG. 5A and FIG. 5B show examples of a computing system and a network environment, in accordance with one or more embodiments.
Figure 5B:
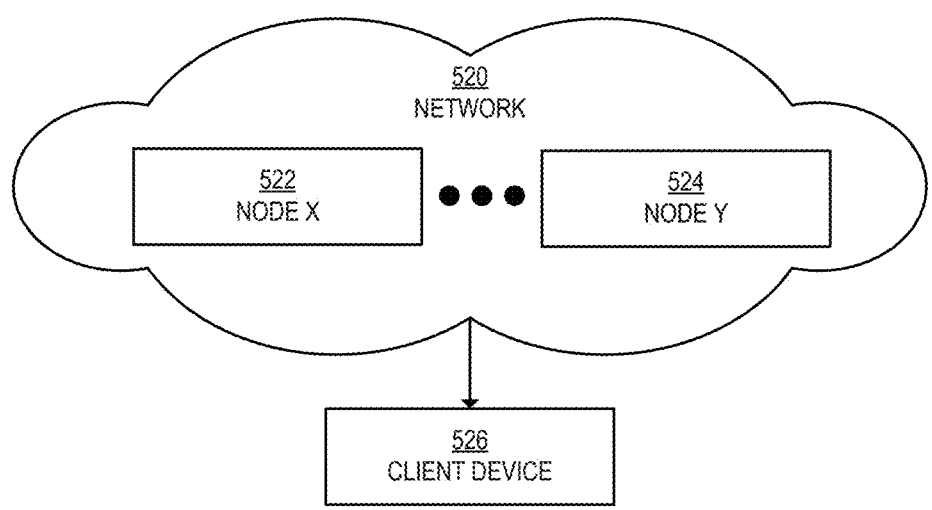

FIG. 5A and FIG. 5B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processor(s) (502), non-persistent storage device(s) (504) (e.g., volatile memory, such as random access memory (RAM), or cache memory), persistent storage device(s) (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (508) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (512), such as a screen (e.g., a liquid crystal display (LCD), a plasma display, a touchscreen, a cathode ray tube (CRT) monitor, a projector, or other display device), a printer, an external storage, or any other output device. One or more of the output device(s) (512) may be the same or different from the input device(s) (510). The input and output device(s) (510 and 512) may be locally or remotely connected to the computer processor(s) (502), the non-persistent storage device(s) (504), and the persistent storage device(s) (506). Many different types of computing systems exist, and the aforementioned input and output device(s) (510 and 512) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of the one or more embodiments.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (500) of FIG. 5A, while performing the one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments.

In the preceding detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities.

As used herein, an entity is an electronic device, not necessarily limited to a computer. Thus, an entity may be a mobile phone, a smart watch, a laptop computer, a desktop computer, a server computer, etc. As used herein, the term "computer" is synonymous with the word "entity," unless stated otherwise.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
    transforming a plurality of metrics, related to a computer network environment, into a digital image comprising a plurality of pixels that represent the plurality of metrics,
        wherein the computer network environment initially is load balanced by a first load balancing scheme selected from among a plurality of load balancing schemes;
    generating a classification of the digital image;
    selecting, based on the classification of the digital image, a selected load balancing scheme from among the plurality of load balancing schemes; and
    changing the first load balancing scheme to the selected load balancing scheme such that the selected load balancing scheme is applied to the computer network environment.

2. The method of claim 1, wherein generating the classification of the digital image comprises:
    executing an image recognition machine learning model that takes, as input, the plurality of pixels of the digital image and that produces, as output, the classification of the digital image.

3. The method of claim 2, further comprising:
    biasing the classification by modifying, prior to executing the image recognition machine learning model, the digital image by applying a mask to the digital image.

4. The method of claim 3, wherein modifying comprises:
    applying the mask to perform at least one of highlighting or deemphasizing at least one portion of the digital image,
    wherein the mask is configured to improve a probability that the image recognition machine learning model outputs the classification to favor selection of the selected load balancing scheme.

5. The method of claim 2, further comprising:
    training the image recognition machine learning model using past images generated from past metrics of the computer network environment.

6. The method of claim 1, wherein transforming comprises:
    selecting at least one selected pixel from the plurality of pixels to represent a selected metric from the plurality of metrics; and
    selecting at least one of a color and an intensity of the at least one selected pixel to represent a measured value of the selected metric.

7. The method of claim 1, wherein transforming comprises:
    selecting a sub-plurality of pixels from the plurality of pixels to form a pattern, wherein the pattern represents a selected metric from the plurality of metrics.

8. The method of claim 7, wherein transforming further comprises:
    selecting at least one of a size of the pattern, a type of the pattern, an intensity of the pattern, and a color of the pattern to represent a measured value of the selected metric.

9. The method of claim 7, wherein transforming further comprises:
    forming the pattern into a human-recognizable pattern.

10. The method of claim 1, wherein selecting comprises at least one of:
    selecting a static load balancing scheme when the digital image is classified as a low traffic image;
    selecting a dynamic load balancing scheme when the digital image is classified as a medium traffic image;
    selecting a work stealing load balancing scheme when the digital image is classified as a heavy traffic image; and
    periodically switching between the dynamic load balancing scheme and the work stealing load balancing scheme when the digital image is classified as representing a presence of a malicious user.

11. A system comprising:
    a processor;
    a computer network environment in communication with the processor, wherein initially a first load balancing scheme is applied to the computer network environment;
    a data repository in communication with the processor and storing:
        a plurality of metrics relating to the computer network environment,
        a digital image comprising a plurality of pixels that represent the plurality of metrics,
        a classification of the digital image,
        a plurality of load balancing schemes applicable to balancing a network load in the computer network environment, wherein the first load balancing scheme is selected from the plurality of load balancing schemes; and
        a selected load balancing scheme selected from the plurality of load balancing schemes;
    an image generation engine configured to transform the plurality of metrics into the digital image;
    an image recognition machine learning model configured to take, as input, the plurality of pixels and produce, as output, the classification; and a selection controller configured to:
  select the selected load balancing technique based on the classification, and
  change the first load balancing scheme to the selected load balancing scheme such that the selected load balancing scheme is applied to the computer network environment.

12. The system of claim 11, further comprising a mask controller configured to:
  bias the classification by modifying, prior to executing, the digital image by applying a mask to the digital image.

13. The system of claim 12, wherein the mask controller is further configured to modify the digital image by:
  applying the mask to perform at least one of highlighting or deemphasizing at least one portion of the digital image,
    wherein the mask is configured to improve a probability that the image recognition machine learning model outputs the classification to favor selection of the selected load balancing scheme.

14. The system of claim 11, further comprising:
  a metrics generation engine configured to collect, prior to transforming, the plurality of metrics.

15. The system of claim 11, wherein the image generation engine is configured to transform the metrics into the digital image by:
  selecting a sub-plurality of pixels from the plurality of pixels to form a pattern, wherein the pattern represents a selected metric from the plurality of metrics.

16. The system of claim 15, wherein transforming further comprises:
  selecting at least one of a size of the pattern, a type of the pattern, an intensity of the pattern, and a color of the pattern to represent a measured value of the selected metric; and
  forming the pattern into a human-recognizable pattern.

17. A method comprising:
  transforming a plurality of metrics, related to a computer network environment, into a digital image comprising a plurality of pixels that represent the plurality of metrics,
    wherein the computer network environment initially is load balanced by a first load balancing scheme selected from among a plurality of load balancing schemes;
  generating a masked digital image by applying a mask to the digital image by further modifying the digital image to bias a classification of the digital image either towards a selected classification of the digital image or away from the selected classification;
  generating the classification of the digital image by executing an image recognition machine learning model that takes, as input, the plurality of pixels of the masked digital image and that produces, as output, the classification of the digital image, wherein the classification is one of the selected classification or a second classification of the digital image;
  selecting, based on the classification of the digital image, a selected load balancing scheme from among the plurality of load balancing schemes; and
  changing the first load balancing scheme to the selected load balancing scheme such that the selected load balancing scheme is applied to the computer network environment.

18. The method of claim 17, wherein transforming comprises:
  selecting at least one selected pixel from the plurality of pixels to represent a selected metric from the plurality of metrics; and
  selecting at least one of a color and an intensity of the at least one selected pixel to represent a measured value of the selected metric.

19. The method of claim 17, wherein applying the mask comprises:
  performing at least one of highlighting or deemphasizing at least one portion of the digital image.

20. The method of claim 17, wherein selecting comprises at least one of:
  selecting a static load balancing scheme when the digital image is classified as a low traffic image;
  selecting a dynamic load balancing scheme when the digital image is classified as a medium traffic image;
  selecting a work stealing load balancing scheme when the digital image is classified as a heavy traffic image; and
  periodically switching between the dynamic load balancing scheme and the work stealing load balancing scheme when the digital image is classified as representing a presence of a malicious user.

* * * * *